United States Patent [19]

Hashimoto

[11] 4,402,395
[45] Sep. 6, 1983

[54] METHOD AND DEVICE FOR PREVENTING A FLEXIBLE TUBULAR BELT FROM TWISTING FOR USE IN A TUBULAR BELT CONVEYER

[75] Inventor: Kunio Hashimoto, Fukuoka, Japan

[73] Assignee: Haruo Okazaki, Fukuoka, Japan

[21] Appl. No.: 269,479

[22] Filed: Jun. 2, 1981

[30] Foreign Application Priority Data

Feb. 18, 1981 [JP] Japan ................... 56-22528
Feb. 24, 1981 [JP] Japan ................... 56-25733
Feb. 27, 1981 [JP] Japan ................... 56-28006
Mar. 4, 1981 [JP] Japan ................... 56-30971
Mar. 6, 1981 [JP] Japan ................... 56-32155

[51] Int. Cl.³ .............................. B65G 39/16
[52] U.S. Cl. ..................... 198/807; 198/819
[58] Field of Search ................ 198/806–808, 198/819; 226/15, 18, 21, 23

[56] References Cited

U.S. PATENT DOCUMENTS 1,486,259 3/1924 Nelson ................... 198/808
2,914,957 12/1939 Johnson ............... 198/807 X
3,429,422 2/1969 Yoshimura ........ 198/819 X
3,682,294 8/1972 Milek ................... 198/808

FOREIGN PATENT DOCUMENTS 943817 5/1936 Fed. Rep. of Germany ...... 198/819
1033031 6/1966 United Kingdom ............... 226/21

Primary Examiner—Robert C. Watson
Assistant Examiner—Douglas D. Watts
Attorney, Agent, or Firm—Marvin E. Jacobs

[57] ABSTRACT

A method and device for preventing a flexible tubular belt from twisting for use in a tubular belt conveyer are disclosed. A flexible tubular belt is extended between first and second rollers, positioned at a certain distance away from each other, on which the tubular belt is opened, and the belt moving between the two rollers in the tubular form is supported by sets of support rollers which are radially arranged around the peripheries of the belt in contact therewith and are rotatably mounted to support frames. Twisting of the belt is prevented by means which varies an angle of a correction roller extending in a direction substantially perpendicular to the direction of movement of the belt in contact therewith. The correction rollers may be disposed in contact with the bottom and/or sides of the belt.

8 Claims, 16 Drawing Figures

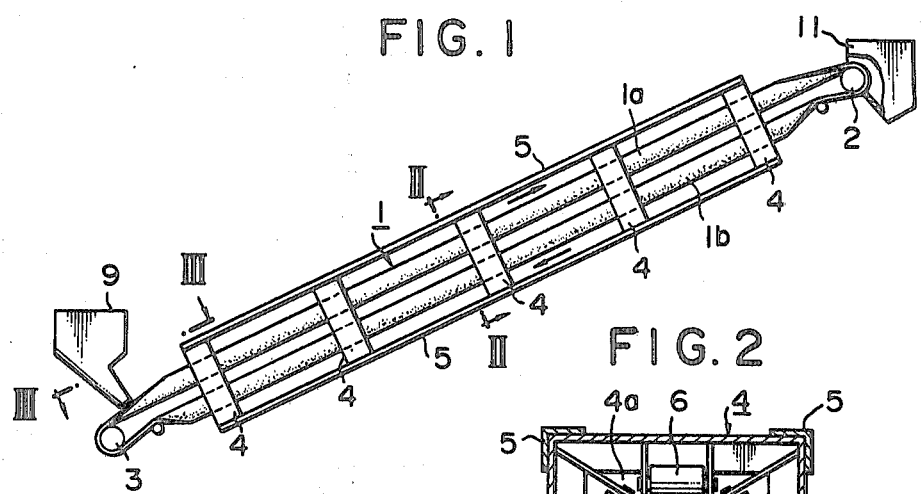
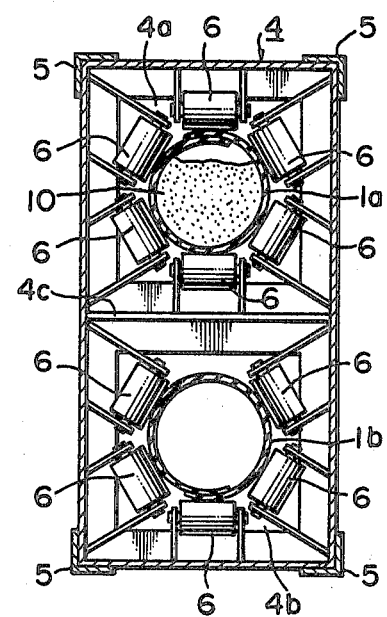
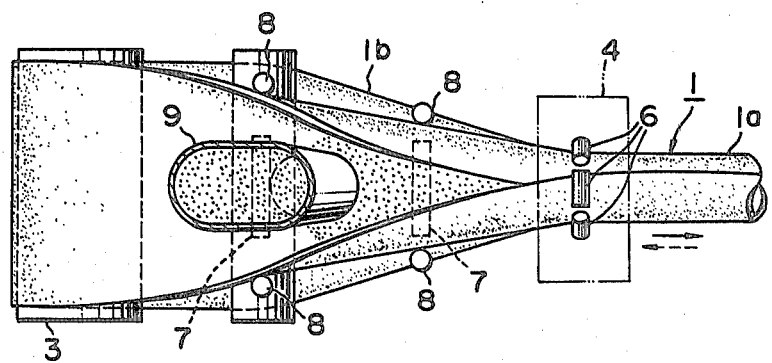

METHOD AND DEVICE FOR PREVENTING A FLEXIBLE TUBULAR BELT FROM TWISTING FOR USE IN A TUBULAR BELT CONVEYER

BACKGROUND OF THE INVENTION

The present invention relates to a method and device for preventing a flexible tubular belt from twisting, for use in a tubular belt conveyer.

A tubular belt conveyer comprising a flexible tubular endless belt for conveying and elevating bulk material such as powder, granule, pulverized solid, and a mixture thereof which are completely enclosed within the tubular belt 1, in any direction and any height, has already been developed.

In FIGS. 1–3, there is shown one embodiment of such a conventional tubular belt conveyer. A flexible tubular endless belt 1 which is made of a flexible or elastic material such as rubber, somewhat soft plastic material, or the like, and which is normally biased in a tubular form by its own rolling up tendency around its axis, its inner and outer side ends overlapping each other along its length, is stretched between an upper drive roller 2 and a lower roller 3 on which the endless belt is extended or opened in its width direction against its own rolling up tendency, at a standard slope angle, as shown in FIG. 1.

The tubular belt 1 is properly supported by a plurality of support frames 4 which are positioned along angle frame plates 5 at a certain distance between the two rollers 2 and 3 along the travelling path of the belt 1. Each support frame 4 comprises upper and lower chambers 4a and 4b separated by a partition plate 4c, as shown in FIG. 2, through which a moving path 1a and a return path 1b of the belt 1 are passed. In each chamber 4a or 4b of the support frame 4 a plurality of support rollers 6 are arranged radially around and in contact with the tubular belt 1. The support rollers 6 hold and maintain the tubular form of the belt 1.

The belt 1 opened on the lower roller 3 is closed gradually into the tubular form by its own rolling up force while guide rollers 7 and 8 support the bottom and both the sides of the belt 1, as shown in FIG. 3. In this process, bulk material 10 such as powder, granule, pulverized solid, and a mixture thereof, is fed into the belt opened from a hopper 9 situated above the lower roller 3.

The tubular belt 1 now encloses the bulk material 10 completely, while the side ends of the belt 1 overlap each other, is passed through the upper chambers 4a of the support frames 4 along the moving path 1a of the belt 1, while the tubular belt 1 is supported by the support rollers 6 in the upper chambers 4a, as described above. In this process, the side ends overlapped are situated in the top of the belt, and hence there is no danger that the bulk material enclosed in the tubular belt 1 completely is spilt over the belt 1.

Then, the tubular belt 1 is opened gradually near the upper drive roller 2 by a belt opening mechanism (not shown) having the same construction as the belt closing mechanism shown in FIG. 3. The opened belt 1 is turned around the upper drive roller 2, while the bulk material 10 conveyed is discharged from the belt 1 to a receiver 11 positioned in the top end of the belt 1.

Then, the belt 1 is moved downwards along the return path 1b of the belt 1. The belt 1 opened is gradually rounded again to the tubular form by its own rolling up tendency via a guide roller. The empty tubular belt 1 is passed through the lower chambers 4b of the support frames 4 while it is supported by the support rollers 6 in the lower chambers 4b, as described above, and while the side ends overlapped each other are situated in the bottom of the tubular belt 1. The tubular belt 1 is then gradually opened again via another guide roller, and the opened belt 1 is returned to the lower roller 3.

This kind of belt conveyer is sometimes extended to a long length such as some hundreds of meter. When the distance between the upper and the lower rollers 2 and 3 is long, especially such a long length, the tubular belt 1 is often twisted around its axis according to the following causes:

(a) a partial or deformed abrasion of the mechanical members and so forth by a long time of use;

(b) a disorder of positions of the support rollers;

(c) an accuracy error of manufacture of the support rollers and their support members;

(d) a partial or deformed abrasion of the support rollers; and (e) an irregularity of thickness, elasticity, hardness, and so forth of the flexible tubular belt.

Especially, the twist of the tubular belt 1 in the moving path 1a causes a spillover of the bulk material 10 enclosed therein, and imparts excessive forces to the belt 1 and a drive motor, thereby accelerating and abrasions and damages of them greatly.

SUMMARY OF THE INVENTION

It is an object of the present invention to provide a method for preventing a flexible tubular belt from twisting, for use in a tubular belt conveyer free from the aforementioned disadvantages, which is simple, stable and reliable.

It is another object of the present invention to provide a device for preventing a flexible tubular belt from twisting, for use in a tubular belt conveyer free from the aforementioned disadvantages, which is simple, stable and reliable.

According to the present invention there is provided a method for preventing a flexible tubular belt from twisting, for use in a tubular belt conveyer wherein a flexible tubular belt is extended between first and second rollers, positioned at a certain distance away each other, on which the tubular belt is opened, and wherein the belt moving between the two rollers in the tubular form is supported by sets of support rollers which are radially arranged around the peripheries of the belt in contact therewith and are rotatably mounted to support frames, the improvement comprising the step of varying an angle of a correction roller extending in a direction substantially perpendicular to the moving direction of the belt in contact therewith.

According to the present invention there is also provided a device for preventing a flexible tubular belt from twisting, for use in a tubular belt conveyer wherein a flexible tubular belt is extended between first and second rollers, positioned at a certain distance away each other, on which the tubular belt is opened, and wherein the belt moving between the two rollers in the tubular form is supported by sets of support rollers which are radially arranged around the peripheries of the belt in contact therewith and are rotatably mounted to support frames, the improvement comprising means which varies an angle of a correction roller extending in a direction substantially perpendicular to the moving direction of the belt in contact therewith.

BRIEF DESCRIPTION OF DRAWINGS

The present invention will be described with reference to preferred embodiments thereof, in connection with the accompanying drawings in which similar numbers denote similar members throughout figures, in which:

FIG. 1 is a schematic side view of a conventional tubular belt conveyer;

FIG. 2 is an enlarged cross-sectional elevation, taken along the line II—II in FIG. 1;

FIG. 3 is an enlarged plan view, taken along the line III—III in FIG. 1;

DESCRIPTION OF PREFERRED EMBODIMENTS

Figure 4:
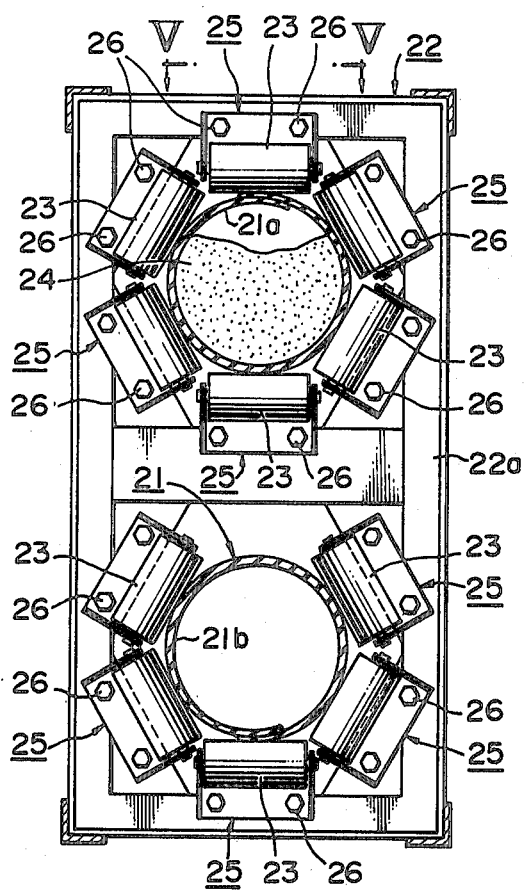
FIG. 4 is an enlarged elevational view, similar to FIG. 2, of a support frame to which the first embodiment of the present invention is applied.

Referring to the drawings there are shown in FIGS. 4–16 preferred embodiments of the present invention.

Figure 5:
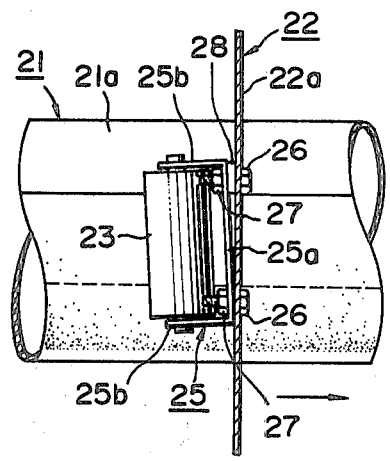
FIG. 5 is an enlarged fragmentary plan view, taken along the line V—V in FIG. 4.
Figure 6:
FIG. 6 is a perspective view of a spacer shown in FIG. 5.

In FIGS. 4–6 there is shown a support frame 22 of the same type as that of FIGS. 1–3, to which the first embodiment of the present invention is applied. An flexible tubular endless belt 21 of the same type as that of FIGS. 1–3 is supported by support rollers 23 having the same construction and functions as those of FIGS. 1–3, which are mounted radially to the support frame 22. In the moving path 21a of the tubular belt 21 bulk material 24 is enclosed therein.

Each support roller 23 is rotatably mounted to a roller support 25 comprising a base plate 25a and a pair of side plates extending at a certain distance from the ends of the base plate 25a in a direction perpendicular to the base plate 25a, the side plates 25b rotatably supporting the support roller 23 parallel with the base plate 25a.

The roller support 25 is mounted to an inside frame 22a of the support frame 22 in the end portions of the base plate 25a by bolts 26 and nuts 27 so that the rotation axis of the support roller 23 may be perpendicular to the moving direction of the belt 21.

When the tubular belt 21 is twisted in the clockwise direction with reference to the moving path 21a of the belt 21 shown in FIG. 4, one or a plurality of support rollers 23 is or are inclined by inserting a reversed U-shaped spacer or spacers 28, one is shown in FIG. 6, between the inside frame or frames 22a of the support frame or frames 22 and the base plate or plates 25a of the roller support or supports 25, on the bolt or bolts 26 positioned in the opposite side or sides with respect to the twisting direction near the twisting part of the belt 21, as clearly shown in FIG. 5. Therefore, the rotation axis or axes of the support roller or rollers 23 is inclined or are inclined, and such a support roller or support rollers 23 gives or give a twisting force in the counter-clockwise direction in FIG. 4 to remove the twisting force of the moving path 21a of the belt 21.

In this embodiment, the spacer 28 can be thin, and a plurality of the thin spacers 28 can be used together depending on the twisting force of the tubular belt 21.

Usually, in the return path 21b of the tubular belt 21, since no bulk material 24 is enclosed within the belt 21 and thus its weight is light, the tubular belt 21 is slightly twisted, and even if the tubular belt 21 is twisted a little, there is little influence of the twisting. Hence, usually, no such a twisting force removing mechanism of the belt 21 may be provided with, and, as occasion demands, the twisting force removing mechanism is used in the return path 21b of the belt 21.

Figure 7:
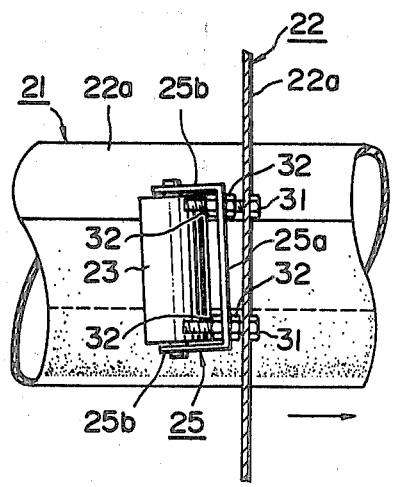
FIG. 7 is an enlarged fragmentary plan view, similar to FIG. 5, of the second embodiment of the present invention.

In FIG. 7 there is shown the second embodiment of the present invention, having the same construction as the first embodiment described above, except that the base plate 25a of each roller support 25 is mounted to the inside frame 22a of the support frame 22 in the end portions of the base plate 25a by means of a pair of bolts 31 and a pair of double nuts 32, instead of the pair of bolts 26, the pair of nuts 27 and the spacer 28 of the first embodiment described above, between the inside frame 22a of the support frame 22 and the base plate 25a of the roller support 25 at each bolt 31 may be adjustable by fixing the base plate 25a of the roller support 25 to the bolts 31 which are secured to the inside frame 22a of the support frame 22, by means of the double nuts 32.

In this embodiment, the same functions as the first embodiment described above can be obtained. Further, the inclination of the bearing member 22, i.e. the support roller 23 can be adjustable continuously, accurately and readily as compared with the first embodiment.

Figure 8:
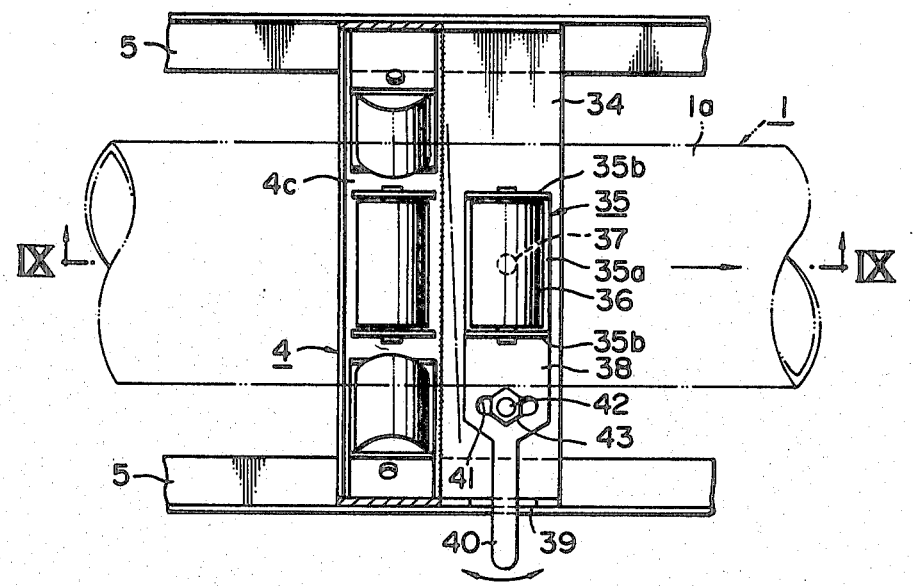
FIG. 8 is an enlarged plan view of the third embodiment of the present invention, in which the moving path of the tubular belt is shown by imaginary lines.
Figure 9:
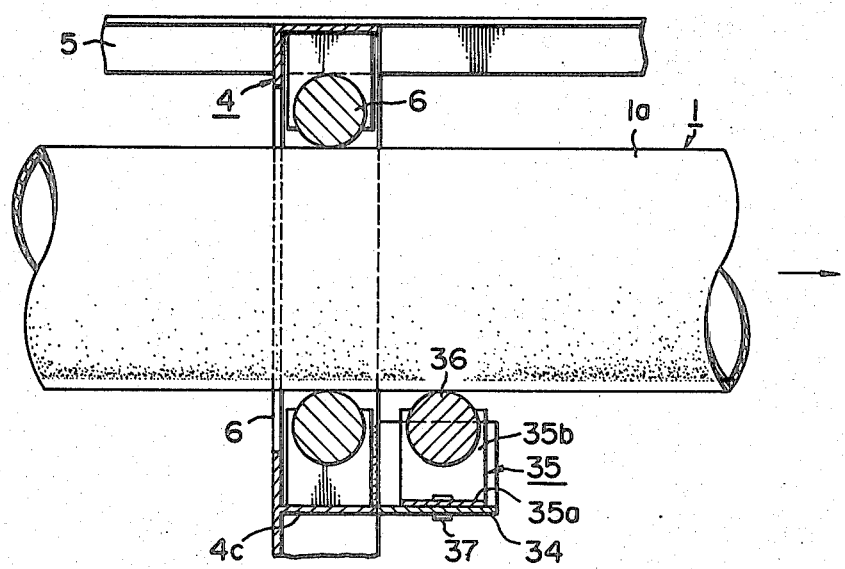
FIG. 9 is a longitudinal cross-section, taken along the line IX—IX in FIG. 8.

In FIGS. 8 and 9, there is shown the third embodiment of the present invention, which is applied to the conventional belt conveyer shown in FIGS. 1–3. FIG. 8 is a transverse cross-section of the support frame 4 viewing the moving path 4a of the belt 1 from the lower side.

A L-shaped bracket 34 having a side plate extends frontwards at a certain distance from the partition plate 4c of the support frame 4. A roller support 35 comprises a base plate 35a and a pair of side plates 35b extending at a certain distance from the ends of the base plate 35a in a direction perpendicular to the base plate 35a, and the side plates 35b rotatably support a twist correction roller 36 therebetween in contact with the bottom of the going path 1a of the belt 1.

The base plate 35a is pivotally mounted to the bracket 34 through a vertical pivot pin 37 in its center, and its one end is connected to a stop plate 38 horizontally extending in a direction perpendicular to the moving direction of the belt 1. To the free end of the stop plate 38 a lever 40 for pivoting the correction roller 36 is integrally attached. The pivot lever 40 is passed through a slot 39 formed in the side plate of the bracket 34.

The stop plate 38 is provided with a circular arc slot 41 whose center is the vertical pivot pin 37. A stop bolt 42 is passed vertically through the hole of the bracket 34 and the arc slot 41 and its screw end part beyond the arc slot 41 is engaged with a stop nut 43. The pivotable stop plate 38 is fixed with respect to the bracket 34 by screwing up the bolt 42 and the nut 43. In this embodiment, a female screw may be tapped in the bracket 34 and the stop plate 38 can be fixed to the bracket 34 only by screwing the bolt into the female screw formed without using the nut.

In this embodiment, when the moving path 1a of the belt 1 is twisted in the clockwise direction with respect to the going direction of the belt 1, the nut 43 is loosened, and th pivot liner 40 and thus the roller support 35 are pivoted clockwise in FIG. 8 around the pivot pin 37 so that the correction roller 36 may be inclined with respect to the moving direction of the belt 1. Then, the nut is tightened again in order to fix the correction roller 36 inclination.

Hence, the correction roller 36 imparts the twisting force in the counterclockwise direction with respect to the moving direction of the belt 1, as described above, thereby correcting or removing the twist of the moving path 1a of the belt 1.

In this case, the correction roller 36 is preferably provided with fine grooves or ribs on its contact surface, or is preferably covered by a nonskid material such as rubber, over its contact surface, so as to increase the friction between the belt 1 and the correction roller 36.

In this embodiment, of course, such correction rollers 36 may be mounted to the right and left sides of the moving path 1a of the belt 1, and a plurality of the correction rollers 36 may be mounted to the bottom and the sides of the moving path 1a of the belt 1, as occasion demands. Further, the correction roller or rollers 36 can be provided on the return path 1b of the belt 1, as occasion demands, in the same manner as the moving path 1a of the belt 1, as described above in connection with the first embodiment.

Figure 10:
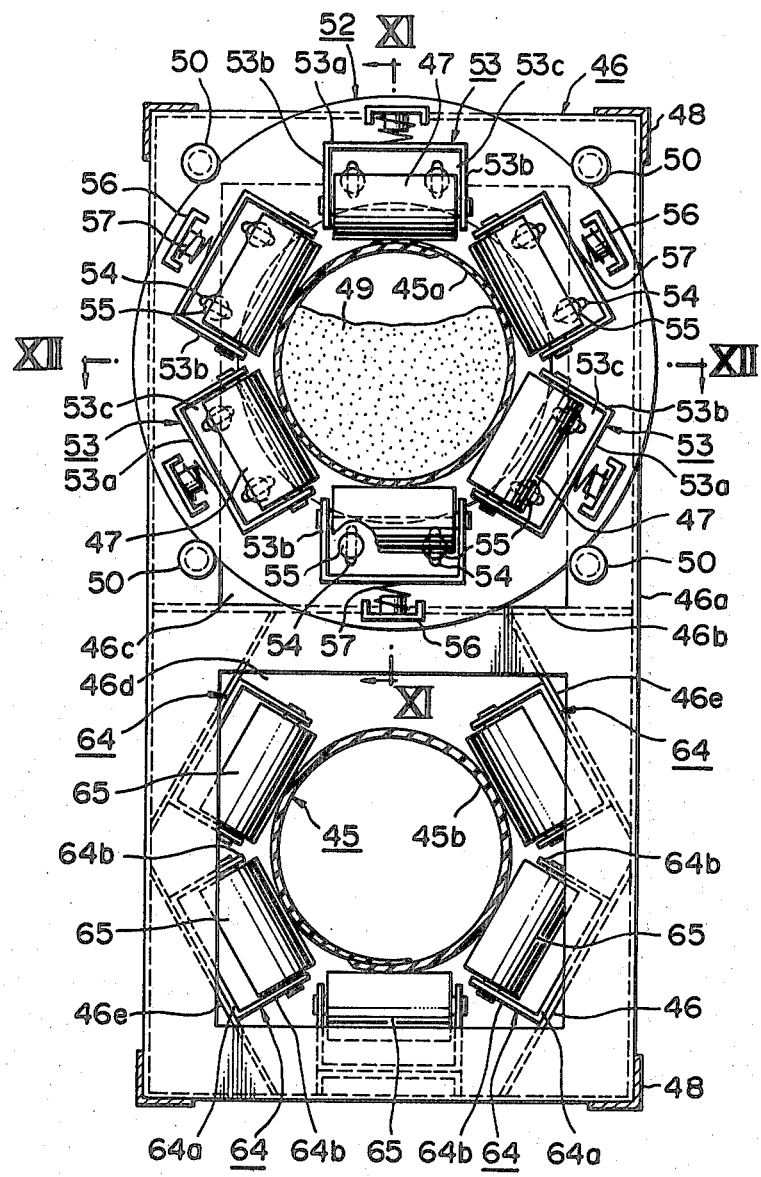
FIG. 10 is an enlarged elevational view, similar to FIG. 4, of another support frame to which the fourth embodiment of the present invention is applied.
Figure 11:
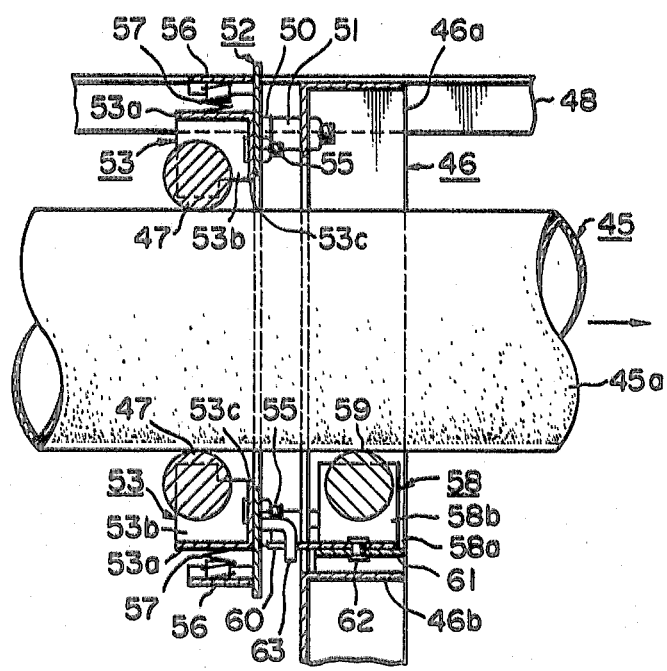
FIG. 11 is a longitudinal cross-section, taken along the line XI—XI in FIG. 10.
Figure 12:
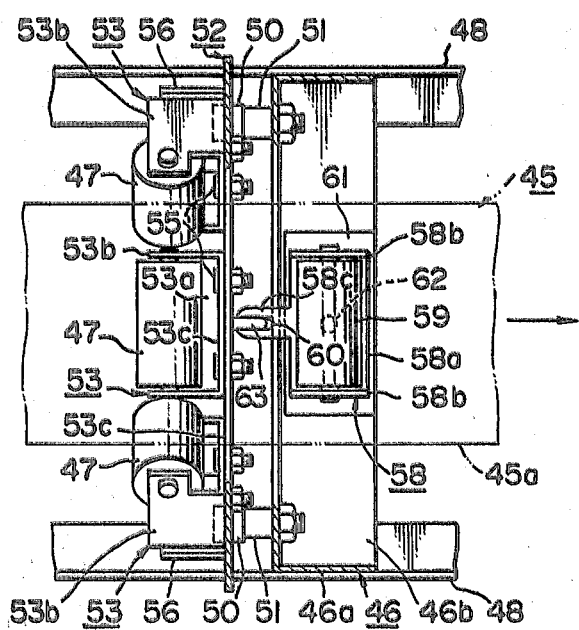
FIG. 12 is a transverse cross-section, taken along the line XII—XII in FIG. 10.

In FIGS. 10-12, there is shown the fourth embodiment of the present invention. A flexible tubular endless belt 45 of the same type as that of FIGS. 1-3 is supported by support rollers 47 of the same type as those of FIGS. 1-3, which are mounted radially to a support frame 46, as hereinafter described, which is the same type of FIGS. 1-3, mounted to angle frame plates 48 of the same type as those of FIGS. 1-3. In the moving path 45a of the tubular belt 45 the bulk material 49 enclosed therein is transferred.

The support frame 46 comprises a rectangular frame 46a, a partition plate 46b by which the support frame 46 is divided into upper and lower chambers 46c and 46d, and mount plates 46e which are arranged at a slope of 60 degrees with respect to the horizontal plane in the four corners of the lower chamber 46d of the support frame 46.

Four annular plate hold rollers 50 are rotatably disposed to the four corners of the upper chamber 46c of the support frame 46 on the rear surface of the rectangular frame 46a through four pins 51. An annular plate 52 having an inner diameter somewhat larger than the outer diameter of the moving path 45a of the tubular belt 45 is held by the four hold rollers 50 on its outer periphery.

Six roller supports 53, each comprising a base plate 53a, a pair of side plates 53b extending from the ends of the base plate 53a perpendicular thereto, and a mount plate 53c connected to the one sides of the base plate 53a and the side plates 53b, are mounted radially to the annular plate 52 at an equal interval. A support roller 47 is rotatably mounted to and between the side plates 53b in parallel with the base plate 53a of each roller support 53. Each mount plate 53c is provided with a pair of slots 54 extending in the direction perpendicular to the axis of the support roller 47. Each roller support 53 is slidably mounted to the annular plate 52 by inserting bolts 55 into the slots 54 of the mount plate 53c and the hole formed in the annular plate 52 and engaging nuts with the free ends of the bolts 55, so that the support rollers 47 may be aligned and extend along a peripheral line of the belt 45, perpendicular to the axis of the belt 45.

Six spring stops 56 are secured to the annular plate 52 in its outer periphery portion and are aligned in the radial directions of the roller supports 53. A coil spring 57 is arranged between the base plate 53a of each roller support 53 and each spring stop 56, and the spring 57 biases the roller support 53 in the centripetal direction of the tubular belt 45 so that the support roller 47 may bias the tubular belt 45 in contact wherewith.

A U-shaped correction roller support 58 comprises a base plate 58a and a pair of side plates 58b extending from the ends of the base plate 58a in the direction perpendicular to the base plate 58a, as clearly shown in FIGS. 11 and 12. The side plates 58b rotatably support a correction roller 49 in contact with the bottom surface of the moving path 45a of the belt 45.

The base plate 58a of the correction roller support 58 is provided with a lever 58c in its central rear end, which extends rearwards and is provided with a slot 60 extending in the axis of the belt 45. A bracket 61 is mounted to the upper surface of the partition plate 46b of the support frame 46. The center of the base plate 58a of the correction roller support 58 is pivotally mounted to the center of the bracket 61 via a vertical pivot pin 62. A L-shaped pin 63 whose free end extends downwards, is horizontally mounted to the front lower end portion of the annular plate 52 so that the free end of the L-shaped pin 63 may be inserted into the slot 60 of the lever 58c.

Five roller supports 64, each having the same construction as the correction roller support 58 and comprising a base plate 64a and a pair of side plates 64b extending from the ends of the base plate 64a in the direction perpendicular thereto, the side plates 64b rotatably supporting a support roller 65 in parallel with the base plate 64a, are radially disposed to the mount plates 46e and the bottom part of the rectangular frame 46a of the lower chamber 46d of the support frame 46 by mounting the base plates 64a thereto so that the support rollers 65 may support the return path 45b of the tubular belt 45 in contact with the upper and lower, right and left sides and the bottom thereof.

In this embodiment, when the moving path 45a of the belt 45 is twisted in the clockwise direction of FIG. 10 with respect to the moving direction of the belt 45, since the support rollers 47 disposed to the annular plate 52 are contacted with the belt 45 under pressure, the annular plate 52 is rotated by the twisted belt 45 in the same direction as the twisting direction of the blet 45, with the result that the L-shaped pin 63 is moved together with the annular plate 52 in the same direction as its moving direction, i.e. upwards in FIG. 12.

In the same time, the L-shaped pin 63 pivots the correction roller support 58 together with the correction roller 59 around the pin 62 in the clockwise direction in FIG. 12 by pivoting the lever 58c.

Then, the correction roller 59 gives the twisting force to the belt 45 in the counterclockwise direction with respect to the moving direction of the belt 45, thereby automatically correcting or removing the twist of the moving path 45a of the belt 45, in the same manner as described above.

In this embodiment, although the coil springs 57 impart the pressure to the roller supports 53 for preventing the support rollers 47 from slipping from the belt 45, however, they may be omitted depending on the shapes and the materials of the endless belt 45 and the support rollers 47. The correction roller 59 may also pushed to the belt 45 by using a spring.

Figure 13:
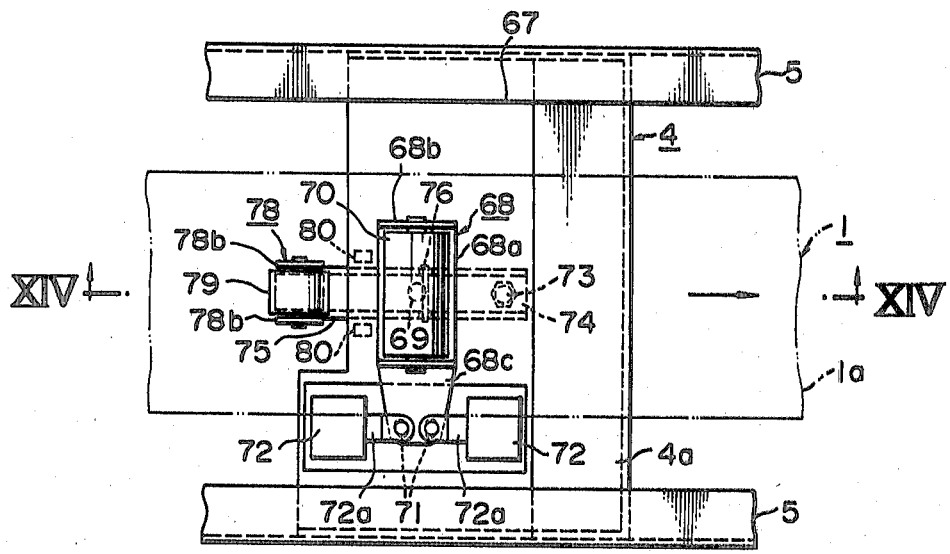
FIG. 13 is an enlarged plan view, similar to FIG. 8, of the fifth embodiment of the present invention, in which the moving path of the tubular belt is shown by an imaginary line.
Figure 14:
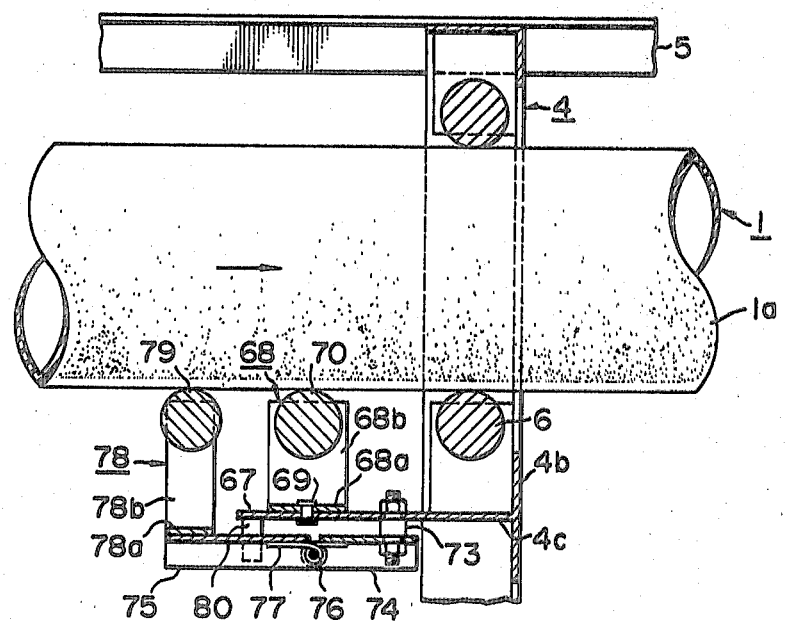
FIG. 14 is a longitudinal cross-section, taken along the line XIV—XIV in FIG. 13.

In FIGS. 13 and 14, there is shown the fifth embodiment of the present invention, which is applied to the conventional belt conveyer of FIGS. 1-3.

A bracket 67 is connected to the partition plate 4c of the support frame 4, extending rearwards to a certain distance. A U-shaped correction roller support 68 comprising a base plate 68a extending in a direction substantially perpendicular to the moving direction of the belt 1 and a pair of side plates 68b extending from the ends of the base plate 68a in the direction perpendicular thereto, is pivotally mounted to the bracket 67 by pivotally mounting the center of the base plate 68a to the center of the bracket 67 via a vertical pivot pin 69. The side plates 68b rotatably support a correction roller 70 in contact with the bottom of the going path 1a of the tubular belt 1. A lever piece 68c is coupled to one end, lower end of FIG. 13, of the base plate 68a and is provided with a pair of slots 71 in its free end portion, the slots 71 extending in the direction of the correction roller's axis.

A pair of solenoid valves 72 having an actuating rod 72a mounted to the upper surface in one side of the bracket 67 in the right and left symmetrical positions in FIG. 13 with respect to the lever piece 68c, and the free ends of the actuating rods 72a are connected to the free end portion of the lever piece 68c at their slots 71 via vertical pivot pins.

A pivot arm 74 is pivotally mounted to the central front end of the lower surface of the bracket 67 by a vertical pivot pin 73. A support arm 75 is pivotally connected to the rear end of the pivot arm 74 via a horizontal pin 76. The support arm 75 is biased upwards by a coil spring 77 fitted on the horizontal pin 76.

A U-shaped detect roller support 78 comprising a base plate 78a and a pair of side plates 78b extending at a certain distance from the ends of the base plate 78a in the direction perpendicular thereto, the side plates 78b rotatably supporting a detect roller 79 which is rolled by the belt 1 along the moving direction of the belt 1, is fixed to the rear free end of the support arm 75. A pair of micro switches 80 for actuating the solenoid valves 72 are mounted to the rear end of the bracket 67 in both sides of the support arm 75.

When the moving path 1a of the tubular belt 1 is twisted in the clockwise direction with respect to the moving direction of the belt 1, the support arm 75 together with the detect roller 79 are shifted in the clockwise direction, upwards in FIG. 13, with respect to the moving direction of the belt 1, and then the micro switch 80 positioned in the upside in FIG. 13 is actuated by the support arm 75. Then, the rear solenoid valve 72 is actuated by the micro switch 80, and pulls in the actuating rod 72a, thereby pivoting the correction roller support 68 together with the correction roller 70 in the clockwise direction in FIG. 13 around the pin 69.

Then, the correction roller 70 gives a twisting force to the belt 1 in the counterclockwise direction with respect to the moving direction of the belt 1, thereby automatically correcting or removing the twist of the moving path 1a of the belt 1, in the same manner as above. When the belt 1 is twisted in the counterclockwise direction with respect to the moving direction of the belt 1, the twist of the tubular belt 1 can also be corrected or removed automatically in the same manner as described above.

Figure 15:
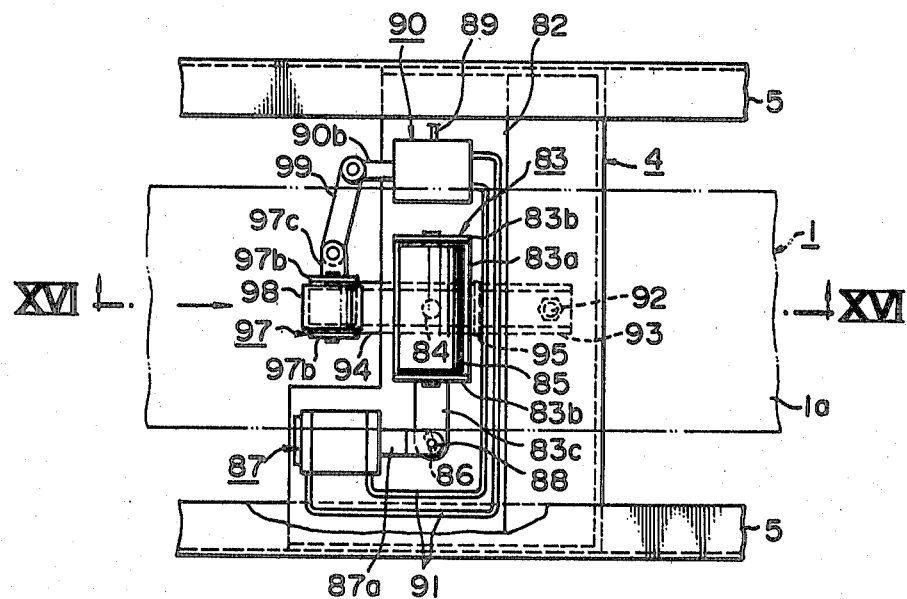
FIG. 15 is an enlarged plan view, similar to FIG. 8, of the sixth embodiment of the present invention, in which the moving path of the tubular belt is shown by an imaginary line.
Figure 16:
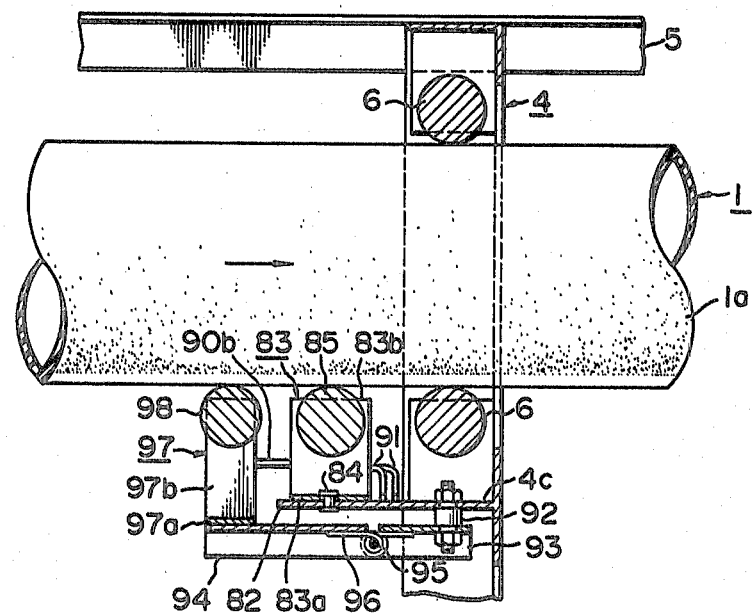
FIG. 16 is a longitudinal cross-section, taken along the line XVI—XVI in FIG. 15.

In FIGS. 15 and 16, there is shown the sixth embodiment of the present invention, which is applied to the conventional belt conveyer of FIGS. 1-3.

A bracket 82 is connected to the partition plate 4c of the support frame 4, extending rearwards. A U-shaped correction roller support 83 comprising a base plate 83a extending in a direction substantially perpendicular to the moving direction of the belt 1 and a pair of side plates 83b extending from the ends of the base plate 83a in the direction perpendicular thereto, is pivotally mounted to the bracket 82 by pivotally mounting the center of the base plate 83a to the center of the bracket 82 via a vertical pivot pin 84. The side plates 83b rotatably support a correction roller 85 in contact with the bottom of the moving path 1a of the tubular belt 1.

A lever 83c is coupled to one end, lower end of FIG. 15, of the base plate 83a and is provided with a slot 86 in its free end portion, the slot 86 extending in the direction of the correction roller's axis.

A hydraulic cylinder 87 having a piston rod 87a, mounted to the upper surface of the rear projection part in one side, the left lower part in FIG. 15, of the bracket 82, faces frontwards. The free front end of the piston rod 87a is pivotally coupled to the free end of the lever 83c at its slot 86 via a vertical pivot pin 88.

A switch valve 90 having an actuating rod 90b, connected to a hydraulic pump (not shown) via a coupling pipe 89, is mounted to the other side, the upper part in FIG. 15, of the bracket 82. The switch valve 90 is connected to the hydraulic cylinder 87 through feed pipes 91.

A pivot arm 93 is pivotally mounted to the center of the lower surface of the partition plate 4c by a vertical pivot pin 92. A support arm 94 is pivotally connected to the rear end of the pivot arm 93 via a horizontal pin 95. The support arm 94 is biased upwards by a coil spring 96 fitted on the horizontal pin 95.

A U-shaped detect roller support 97 comprising a base plate 97a and a pair of side plates 97b extending from the ends of the base plate 97a in the direction perpendicular thereto, the side plates 97b pivotally supporting a detect roller 98 which is rolled by the belt 1 along the moving direction of the belt 1, is mounted to the rear free end of the support arm 94. The detect roller support 97 is provided with a coupling bar 97c projecting horizontally toward the switch valve 90.

The actuating rod 90b and the coupling bar 97c are connected each other in their free ends via a link member 99.

Now, when the moving path 1a of the tubular belt 1 is twisted in the clockwise direction with respect to the moving direction of the belt 1, the support arm 94 together with the detect roller 98 are shifted in the clockwise direction, upwards in FIG. 15, with respect to the moving direction of the belt 1, and then the switch valve 90 is actuated by the support arm 94 through the coupling bar 97c and the link member 99. Then, the hydraulic cylinder 87 actuated by the switch valve 90 pulls in the piston rod 87a, thereby pivoting the correction roller support 83 together with the correction roller 85 in the clockwise direction in FIG. 15 around the pin 84.

Then, the correction roller 85 imparts a twisting force to the belt 1 in the counterclockwise direction with respect to the moving direction of the belt 1, thereby automatically correcting or removing the twist of the moving path 1a of the belt 1, in the same manner as described above. When the belt 1 is twisted in the counterclockwise direction with respect to the moving direction of the belt 1, the twist of the belt 1 can also be corrected or removed automatically in the same manner as described above.

Although the present invention has been described with reference to preferred embodiments thereof, however, various changes and modifications can be made by those skilled in the art without departing from the scope of the present invention.

What is claimed is:

1. A method for preventing a flexible tubular belt from twisting, for use in a tubular belt conveyor wherein a flexible tubular belt is extended between first and second rollers, positioned at a certain distance away from each other, on which the tubular belt is opened, and wherein the belt moving between the two rollers in the tubular form is supported by sets of support rollers which are radially arranged around the peripheries of the belt in contact therewith and are rotatably mounted to support frames, the improvement comprising the step of varying an angle of a correction roller mounted on a correction roller support and extending in a direction substantially perpendicular to the direction of movement of the belt in contact therewith, said angle being varied by shift means for shifting the correction roller in the right or left direction in response to the tubular belt twisting in the opposite direction said shift means and correction roller being operative at a point that the belt is tubular.

2. A method as defined in claim 1, wherein the shift means comprises an annular plate to which the support rollers are radially arranged, and which is rotated by the tubular belt in the same direction as the twisting direction thereof so that the shift means may shift the correction roller in the right or left direction when the tubular belt is twisted in the left or right direction.

3. A method as defined in claim 1, wherein the shift means comprises first and second solenoid valves which are actuated by a detect roller so that the shift means may shift the correction roller in the right or left direction when the tubular belt is twisted in the left or right direction.

4. A method as defined in claim 1, wherein the shift means comprises a combination of a hydraulic cylinder and a switch valve which is actuated by a detect roller so that the shift means may shift the correction roller in the right or left direction when the tubular belt is twisted in the left or right direction.

5. A device for preventing a flexible tubular belt from twisting, for use in a tubular belt conveyor wherein a tubular belt is extended between first and second rollers, positioned at a certain distance away from each other, on which the tubular belt is opened, and wherein the belt moving between the two rollers in the tubular form is supported by sets of support rollers which are radially arranged around the peripheries of the belt in contact therewith and are rotatably mounted to support frames, characterized by comprising:

a correction roller support, a correction roller rotatably received in the support in a direction substantially perpendicular to the direction of movement of the belt and in contact therewith, means pivotally connecting the correction roller support to the support frame and means for varying the angle of the correction roller including shift means for pivoting the support and the correction roller in the right or left direction in response to the tubular belt twisting in the opposite direction said shift means and correction roller being operative at a point that the belt is tubular.

6. A device as claimed in claim 5 in which the shift means comprises an annular plate on which the support frames are mounted, means rotatably mounting the plate in a direction perpendicular to the line of movement of the belt and pivot means pivotably connecting the correction roller support to the plate whereby on twisting of the belt the support rollers rotate the plate and shift the correction roller in the opposite direction of said twisting.

7. A device according to claim 1 in which the shift means includes a detect roller, means mounting the detect roller in contact with the belt in a position forward of said support frame, switch means on said mounting means for sensing rotation of the belt, solenoid means connected to the switch means and an actuating rod connected to the solenoid and to pivot means for pivoting the correction roller in a direction opposite the direction of twisting of the belt.

8. A device according to claim 1 in which the shift means includes a detect roller, means pivotally mounting the detect roller in contact with the belt in a position forward of the correction roller, a switch valve connected to the detect roller, a hydraulic cylinder having a piston rod pivotally connected to the correction roller support and to the hydraulic fluid output of said switch valve whereby on rotation of the belt, the detect roller actuates said valve which supplies fluid to the cylinder to move the rod and pivot the correction cylinder support.

* * * * *